United States Patent
Yamagishi

(10) Patent No.: US 10,870,283 B2
(45) Date of Patent: Dec. 22, 2020

(54) FLOW PATH MEMBERS, LIQUID EJECTING HEADS, AND LIQUID EJECTING APPARATUSES

(71) Applicant: SEIKO EPSON CORPORATION, Tokyo (JP)

(72) Inventor: Ken Yamagishi, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 80 days.

(21) Appl. No.: 16/279,858

(22) Filed: Feb. 19, 2019

(65) Prior Publication Data

US 2019/0255843 A1 Aug. 22, 2019

(30) Foreign Application Priority Data

Feb. 21, 2018 (JP) .................................. 2018-028547

(51) Int. Cl.
*B41J 2/175* (2006.01)
*F16K 31/126* (2006.01)
*B41J 2/14* (2006.01)

(52) U.S. Cl.
CPC ....... *B41J 2/17509* (2013.01); *B41J 2/14233* (2013.01); *B41J 2/175* (2013.01); *F16K 31/126* (2013.01); *B41J 2202/07* (2013.01)

(58) Field of Classification Search
CPC .... B41J 2/17509; B41J 2/175; B41J 2/14233; B41J 2202/07; F16K 31/126
USPC ...................................................... 251/61.1
See application file for complete search history.

(56) References Cited

U.S. PATENT DOCUMENTS

| 2,989,282 | A | * | 6/1961 | White | F16K 7/17 251/61.1 |
| 3,653,408 | A | * | 4/1972 | Coiner | F15C 3/04 137/625.6 |
| 3,856,046 | A | * | 12/1974 | Brown | F16K 31/385 137/625.28 |
| 4,167,247 | A | * | 9/1979 | Sons | B05B 1/267 239/455 |
| 4,744,388 | A | * | 5/1988 | Ariizumi | F15B 13/0405 137/596.14 |
| 6,457,819 | B2 | * | 10/2002 | Santhanam | B41J 2/17503 347/86 |
| 10,611,167 | B2 | * | 4/2020 | Yamagishi | B41J 2/18 |
| 2008/0231671 | A1 | * | 9/2008 | Lee | B41J 2/17596 347/85 |

(Continued)

FOREIGN PATENT DOCUMENTS

JP 2008-201094 A 9/2008
JP 2015-189201 A 11/2015

(Continued)

*Primary Examiner* — Umashankar Venkatesan
(74) *Attorney, Agent, or Firm* — Workman Nydegger

(57) ABSTRACT

A flow path member includes a gas chamber which allows inflow and outflow of gas, and a flexible member that partitions part of the gas chamber and deforms in response to pressure change in the gas chamber, wherein the flexible member has a contact section configured to abut another object, the contact section being disposed inside a regulation section in which deformation is regulated, and the contact section abuts the another object to seal the another object during at least one of depressurization and pressurization of the gas chamber.

17 Claims, 13 Drawing Sheets

(56) References Cited

U.S. PATENT DOCUMENTS

| | | | | |
|---|---|---|---|---|
| 2009/0147064 A1* | 6/2009 | Ito | ............................. | B41J 2/19 |
| | | | | 347/92 |
| 2015/0273851 A1 | 10/2015 | Akahane et al. | | |
| 2017/0217176 A1 | 8/2017 | Sato et al. | | |
| 2017/0217199 A1* | 8/2017 | Yamagishi | ........... | B41J 2/17596 |
| 2018/0292017 A1* | 10/2018 | Yamagishi | ........... | B41J 2/17509 |

FOREIGN PATENT DOCUMENTS

| | | | |
|---|---|---|---|
| JP | 2015-189202 A | 11/2015 |
| JP | 2015-189203 A | 11/2015 |
| JP | 2017-202677 A | 11/2017 |

* cited by examiner

FLOW PATH MEMBERS, LIQUID EJECTING HEADS, AND LIQUID EJECTING APPARATUSES

CROSS REFERENCE TO RELATED APPLICATIONS

This application claims priority to Japanese Patent Application No. 2018-028547 filed on Feb. 21, 2018. The entire disclosure of Japanese Patent Application No. 2018-028547 is incorporated herein by reference.

BACKGROUND

1. Technical Field

The present invention relates to flow path members for distributing liquid, gas, or the like, liquid ejecting heads, and liquid ejecting apparatuses.

2. Related Art

Liquid ejecting heads are configured to receive liquid supplied from a liquid supplying member, and eject the liquid through a nozzle in response to actuation of an actuator such as a piezoelectric element. Some liquid ejecting apparatuses having a liquid ejecting head includes a control valve disposed in the middle of a flow path extending from a liquid supplying member to the nozzle of the liquid ejecting head, and the control valve controls liquid supply by opening/closing the flow path. JP-A-2017-202677 is an example of related art. According to the configuration described in JP-A-2017-202677, pressure is applied to a gas chamber, which is partially closed by a bag-shaped elastically deformable member, to thereby expand the flexible member. The expanded flexible member can press and forcibly open a valve member of the control valve. Accordingly, an initial filling operation in which the liquid ejecting head is filled with liquid, and a maintenance operation in which liquid or air bubble is forcibly discharged from the nozzle of the liquid ejecting head can be performed. Further, according to the configuration described in JP-A-2017-202677, by reducing pressure in a degassing space, which is provided adjacent to part of the ink flow path with a gas permeable film, air bubbles contained in ink can be removed, that is, degassing (in other words, defoaming) can be performed. In this configuration, since the gas chamber communicates with the degassing chamber, pressure in the gas chamber is also reduced during degassing operation and the flexible member contracts accordingly.

In order to perform the degassing operation more effectively, it is preferred to maintain the degassing chamber at a depressurized state as long as possible. However, the above configuration has a difficulty in maintaining the depressurized state since gas permeates through the flexible member made of an elastic material such as rubber. Further, for the same reason, it also has a difficulty in maintaining the pressurized state.

SUMMARY

An advantage of some aspect of the invention is that a flow path member, a liquid ejecting head, and a liquid ejecting apparatus, which can maintain a depressurized state and a pressurization state for a longer period of time by reducing gas permeation through the flexible member, are provided.

According to an aspect of the invention, a flow path member includes: a gas chamber which allows inflow and outflow of gas; and a flexible member that partitions part of the gas chamber and deforms in response to pressure change in the gas chamber, wherein the flexible member has a contact section configured to abut another object, the contact section being disposed inside a regulation section in which deformation is regulated, and the contact section abuts the another object to seal the another object during at least one of depressurization and pressurization of the gas chamber.

According to the flow path member of the invention, since the contact section of the flexible member abuts the another object to seal the another object during at least one of depressurization and pressurization of the gas chamber, gas permeation through the flexible member can be reduced. As a result, the depressurized state or pressurized state of the gas chamber can be maintained for a longer period of time.

In the above configuration, the flexible member can include a first portion that allows more gas to permeate therethrough and a second portion that allows less gas to permeate therethrough than the first portion, the another object may have a vent hole, which is a gas distribution site, and the vent hole can be sealed by the contact section included in the second portion.

With this configuration, the vent hole provided in the another object is sealed by the second portion that allows less gas to permeate therethrough. Accordingly, gas permeation can be further reduced, and the depressurized state or pressurized state can be maintained for a longer period of time.

In the above configuration, a thickness of the second portion may be larger than a thickness of the first portion.

With this configuration, since the second portion has an increased thickness compared with the first portion and allows less gas to permeate therethrough, sealing properties can be improved by creating seal by the second portion. On the other hand, since the first portion has a reduced thickness compared with the second portion, it easily deforms in response to pressure change in the gas chamber. Accordingly, the function of the flexible member can be more effectively performed.

Further, at least one of the contact section of the flexible member and an opening of the vent hole may protrude toward the other.

With this configuration, since at least one of the contact section of the flexible member and the opening of the vent hole protrudes toward the other, a contact section between these is limited to the protruding end face of the protrusion, which further increases a contact pressure. Accordingly, sealing properties can be further improved.

Moreover, in the above configuration, the contact section may have a shielding member having high gas shielding properties per unit thickness compared with the flexible member.

With this configuration, the contact section has the shielding member having high gas shielding properties per unit thickness compared with the flexible member. Accordingly, gas permeation can be reduced, and the thickness of the contact section can be reduced. Accordingly, the flexible member can easily deform in response to pressure change in the gas chamber, and contributes to downsizing of the flow path member.

Moreover, in the above configuration, at least one surface of the flexible member may be covered with filling liquid.

With this configuration, since at least one surface of the flexible member is covered with filling liquid, gas permeation through the flexible member can be reduced.

Moreover, in the above configuration, the contact section is desirably in contact with the another object when pressures on both surfaces of the flexible member are equal to each other.

With this configuration, since the contact section is in contact with the another object when pressures on both surfaces of the flexible member are equal to each other, the flexible member does not need to be largely deformed to seal the another object compared with the configuration in which the contact section does not abut the another object when pressures on both surfaces of the flexible member are equal to each other. Accordingly, a so-called creep, which is deformation of the flexible member that does not return to the original shape, can be reduced.

Moreover, in the above configuration, at least one of the flexible member and the another object desirably has smoothness higher than the other member in a region to be in contact with the other member.

With this configuration, both members can be more smoothly separated from each other in release of the sealed state while ensuring the sealing properties. That is, it is possible to reduce occurrence of failure that the sealed state cannot be released.

Further, in the above configuration, the another object may be a sealing member configured to seal part of a liquid flow path in which liquid flows, and is deformable when in contact with the flexible member.

With this configuration, the another object is a sealing member configured to seal part of a liquid flow path in which liquid flows, and is deformable when in contact with the flexible member. Accordingly, when the flexible member abuts and presses the sealing member, the pressure of liquid in the liquid flow path can be increased or the volume of the liquid flow path can be changed. Further, as the flexible member abuts the sealing member for sealing, gas permeation can be reduced.

According to another aspect of the invention, a liquid ejecting head is configured to eject liquid introduced from the flow path member according to any of the above configurations.

According to yet another aspect of the invention, a liquid ejecting apparatus includes: the flow path member according to any of the above configurations; and the above liquid ejecting head.

BRIEF DESCRIPTION OF THE DRAWINGS

The invention will be described with reference to the accompanying drawings, wherein like numbers reference like elements.

DESCRIPTION OF EXEMPLARY EMBODIMENTS

With reference to the drawings, embodiments of the invention will be described. The following embodiments described below as preferred embodiments of the invention have various limitations. However, the scope of the invention is not construed to be limited to these embodiments unless otherwise specified in the following description. In the following description, an ink jet printer (hereinafter, printer) 1 in which an ink jet recording head (hereinafter, recording head) 10 which is a type of a liquid ejecting head is mounted will be described as an example of a liquid ejecting apparatus.

Figure 1:
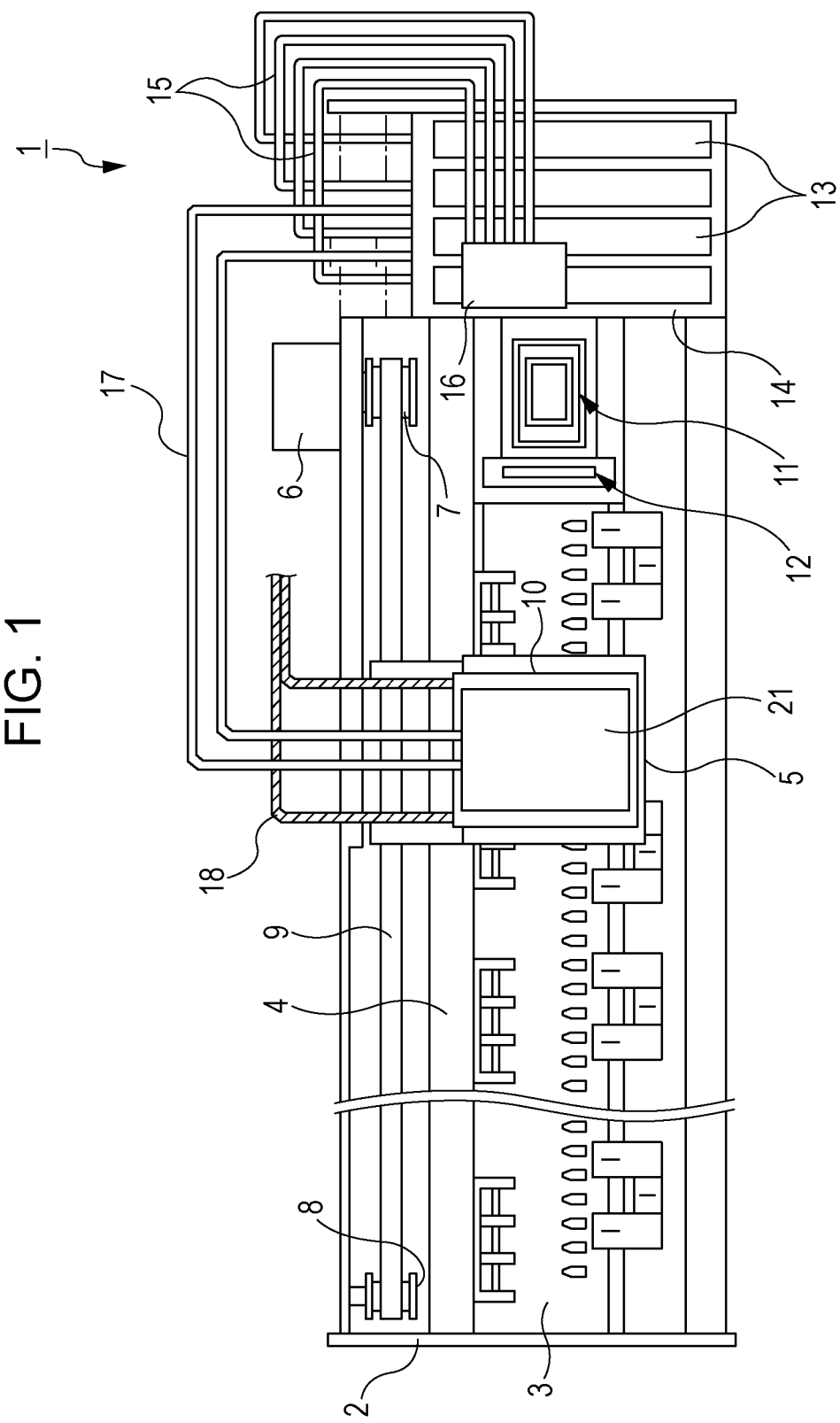
FIG. 1 is a plan view illustrating a configuration of an embodiment of a liquid ejecting apparatus.

FIG. 1 is a plan view illustrating a configuration of an embodiment of a printer 1. The printer 1 according to the present embodiment is an apparatus that performs recording of images or texts by ejecting ink in the form of liquid (an example of liquid in the invention) from a recording head 10 onto a surface of a recording medium such as a recording paper, cloth, resin film, or the like. The printer 1 includes a frame 2 and a platen 3 disposed in the frame 2, and a recording medium is transported onto the platen 3 by a transport mechanism, not shown in the figure. Moreover, a guide rod 4 is hung in the frame 2 so as to extend in parallel with the platen 3. The guide rod 4 slidably supports a carriage 5 which houses the recording head 10. The carriage 5 is configured to move along the guide rod 4 in a main scan direction, which is perpendicular to a sheet transfer direction, by a carriage moving mechanism. The carriage moving mechanism includes a pulse motor 6, a driving pulley 7 that rotates by being driven by the pulse motor 6, an idler pulley 8 disposed on a side opposite to the pulley 7 in the frame 2, and a timing belt 9 hung between the driving pulley 7 and the idler pulley 8. The printer 1 in the present embodiment performs recording operation, that is, liquid ejecting operation by ejecting ink from nozzles 30 (see FIG. 2 and the like) of the recording head 10 while reciprocating the carriage relative to the recording medium.

On one side of the frame 2, a cartridge holder 14 on which ink cartridges 13, which are a type of a liquid storage container, are detachably mounted. The ink cartridges 13 are connected to a pump unit 16, which is a pressure adjustment mechanism, via an air tube 15 such that air from the pump unit 16 is supplied into the respective ink cartridges 13.

Then, the pressurized air applies pressure to an ink pack, not shown in the figure, disposed in each ink cartridge 13 to cause ink in the ink pack to be supplied into the recording head 10 via an ink supplying tube 17. The pump unit 16 is configured to selectively perform pressurizing operation in which air is supplied into a flow path or space connected to the pump unit 16 and depressurizing operation in which air is suctioned from the flow path or the like, in response to an instruction from a control unit (not shown) of the printer 1. The pump unit 16 is configured to be switchingly connected to a capping mechanism 11, described below, and a gas flow path 20 of a valve unit 21, described below, as well as the ink cartridges 13. That is, the pump unit 16 also serves as a pressure adjustment mechanism that applies pressure to a gas chamber 47 via the gas flow path 20 when a control valve 51 disposed in the valve unit 21 is forcibly opened, and reduces pressure of a degassing chamber 70 via the gas flow path 20 when degassing of ink is performed.

Ink supplied from the ink cartridge 13 via the ink supplying tube 17 is first introduced into the valve unit 21 mounted on the carriage 5. Ink introduced into the valve unit 21 is supplied into an ink flow path in the recording head 10 via a filter 74 of a filter unit 22, which is described later, after the supply pressure is adjusted by the control valve 51. The liquid storage container is not limited to those illustrated, and those of various configurations such as cartridge type, pack type, and tank type can be used. The ink supplying tube 17 is a flexible hollow member made of, for example, a synthetic resin, and ink flow paths corresponding to the respective ink cartridges 13 are formed inside the ink supplying tube 17. Further, a flexible flat cable (FFC) 18 is disposed between a main body of the printer 1 and the recording head 10 so as to transmit drive signals and the like from a control unit (not shown) in the main body of the printer 1 to the recording head 10.

At a home position disposed on one side of a movement range of the recording head 10 inside the frame 2, a capping mechanism 11 that seals the nozzle surface of the recording head 10 and a wiping mechanism 12 that wipes the nozzle surface of the recording head 10 are positioned side by side. The capping mechanism 11 seals a surface of the recording head 10 on which the nozzles 30 are formed when the recording head 10 is in a stand-by state at the home position to thereby prevent evaporation of a solvent of ink from the nozzles 30. Further, while sealing the nozzle surface of the recording head 10, the capping mechanism 11 can also cause negative pressure in the sealed space by using the pump unit 16 to which the nozzles 30 are open to thereby perform maintenance operation in which ink or air bubbles are forcibly suctioned from the nozzle 30. The wiping mechanism 12 is configured to perform wiping operation for wiping off ink and the like attached on the nozzle surface by moving relative to the nozzle surface while being in contact therewith.

Figure 2:
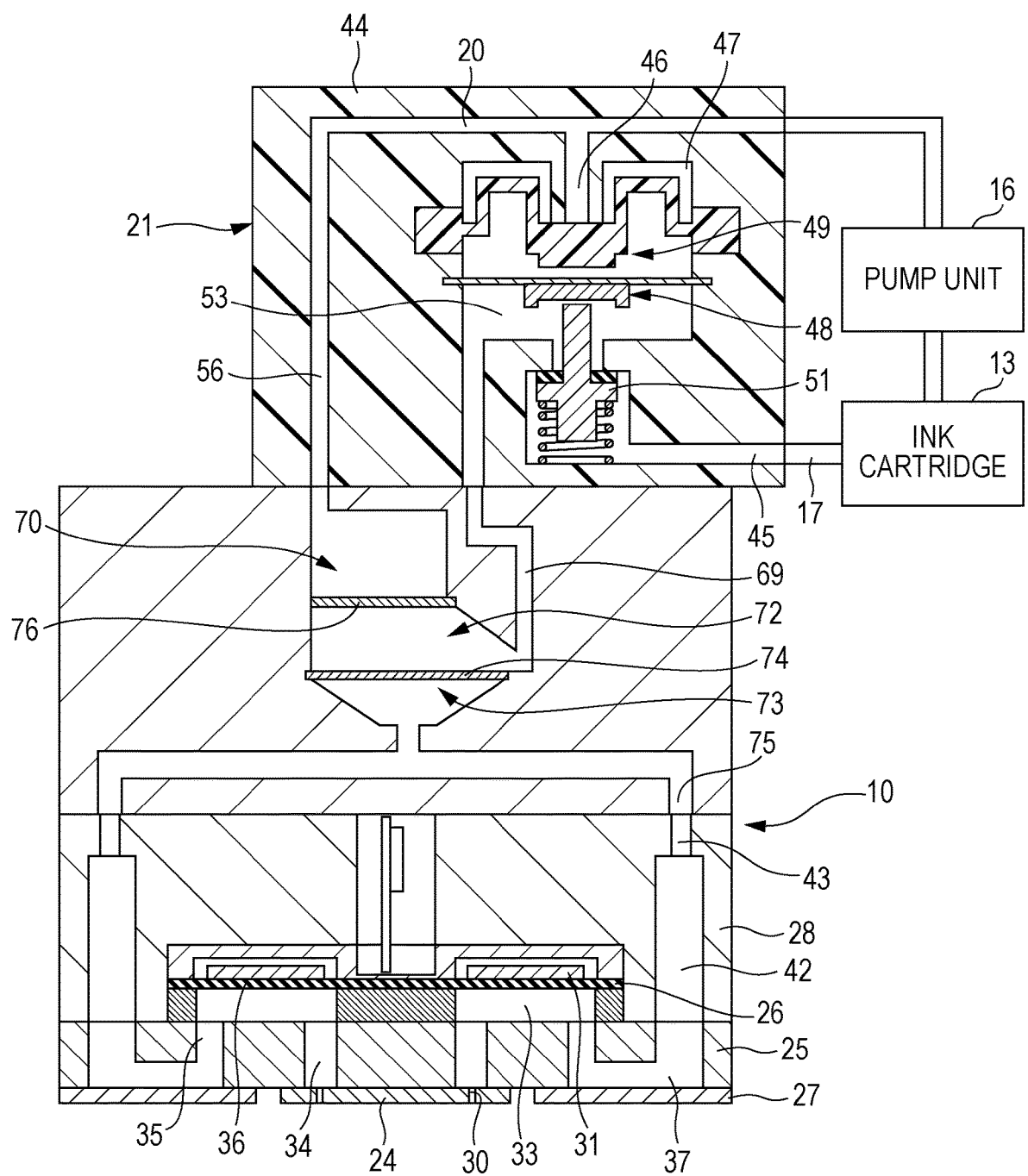
FIG. 2 is a schematic diagram illustrating configurations of a valve unit which is an embodiment of a flow path member, a filter unit, and a liquid ejecting head.

FIG. 2 is a schematic diagram illustrating configurations of the valve unit 21 (an embodiment of the flow path member in the invention), the filter unit 22, and the recording head 10. The recording head 10 of the present embodiment is provided as a unit in which a plurality of components such as a nozzle plate 24, a communication plate 25, an actuator substrate 26, a compliance substrate 27, and a case 28 are stacked and joined by an adhesive or the like.

The actuator substrate 26 of the present embodiment includes a plurality of pressure chambers 33 each communicating with a plurality of nozzles 30 formed on the nozzle plate 24, and a plurality of piezoelectric elements 31, which are actuators that generate pressure change in ink in the respective pressure chambers 33. A vibration plate 36 is disposed between the pressure chambers 33 and the piezoelectric elements 31 such that upper openings of the pressure chambers 33 are sealed by the vibration plate 36 and thus part of the pressure chambers 33 is partitioned. The vibration plate 36 is formed of, for example, an elastic film made of silicon dioxide ($SiO_2$), and an insulating film made of zirconium oxide ($ZrO_2$) formed on the elastic film. The piezoelectric elements 31 are each disposed in regions corresponding to the respective pressure chambers 33 on the vibration plate 36. The piezoelectric element 31 of the present embodiment is a so-called flexure mode piezoelectric element. This piezoelectric element 31 is formed of, for example, a lower electrode layer, a piezoelectric layer, and an upper electrode layer (which are not shown) stacked on the vibration plate 36 in sequence. The piezoelectric element 31 configured as above deforms by flexure when an electric field corresponding to the potential difference between the lower electrode layer and the upper electrode layer is applied between those electrode layers.

The underside of the actuator substrate 26 is connected to the communication plate 25 having an area larger than that of the actuator substrate 26. In the communication plate 25 of the present embodiment, nozzle communication ports 34 communicating between the pressure chambers 33 and the nozzles 30, a reservoir 37 which is common to the respective pressure chambers 33, and individual communication ports 35 communicating between the reservoir 37 and the pressure chambers 33 are formed. The reservoir 37 is a liquid chamber extending in a direction in which the nozzles 30 are disposed side by side. In the present embodiment, two reservoirs 37 are disposed corresponding to two rows of the nozzles 30 on the nozzle plate 24. A plurality of individual communication ports 35 are formed extending in the nozzle row direction, corresponding to the respective pressure chambers 33. The individual communication port 35 communicates with an end of the pressure chamber 33 on a side opposite to that communicating with the nozzle communication port 34.

The nozzle plate 24 on which a plurality of nozzles 30 are formed is bonded to the underside of the communication plate 25 at a substantially center part. The nozzle plate 24 of the present embodiment is a plate-shaped member which is smaller than the communication plate 25. The nozzle plate 24 is bonded by an adhesive or the like to the underside of the communication plate 25 at a position outside the opening of the reservoir 37 and in a region in which the nozzle communication ports 34 are open such that the nozzle communication ports 34 and the plurality of nozzles 30 communicate with each other. In the nozzle plate 24 of the present embodiment, two rows are formed in which the plurality of nozzles 30 are arrayed. Moreover, the compliance substrate 27 is bonded to the underside of the communication plate 25 at a position outside the nozzle plate 24. The compliance substrate 27 is positioned and bonded to the underside of the communication plate 25 so as to seal the opening of the reservoir 37 on the underside of the communication plate 25. The compliance substrate 27 serves to mitigate pressure change in the ink flow path, in particular, in the reservoir 37.

The actuator substrate 26 and the communication plate 25 is fixed to the case 28. In the case 28, introduction liquid chambers 42 each communicating with the reservoir 37 in the communication plate 25 are formed on both sides of the actuator substrate 26. Further, introduction ports 43 each communicating with the introduction liquid chamber 42 are formed on the top of the case 28. The introduction port 43 communicates with an ink supply path 75 in the filter unit 22. Accordingly, ink supplied from the valve unit 21 and the filter unit 22 is introduced into the introduction port 43, the introduction liquid chamber 42, and the reservoir 37, and then supplied from the reservoir 37 into the pressure chamber 33 via the individual communication port 35. Then, in the recording head 10 configured as above, when the piezoelectric elements 31 are driven while the flow paths extending from the introduction liquid chambers 42 to the nozzles 30 via the reservoirs 37 and the pressure chambers 33 are filled with ink, pressure change is applied to ink in the pressure chambers 33. In response to this pressure change, ink is ejected from the nozzles 30. The liquid ejecting head is not limited to the recording head 10 illustrated above, and those having various known configurations can also be used. For example, a liquid ejecting head configured to circulate ink between the liquid ejecting head and the liquid storage container can also be used. Alternatively, so-called line-type liquid ejecting heads in which a group of unit heads having a plurality of unit heads are arrayed in a direction perpendicular to a transport direction of the recording medium such that the entire length of the nozzle group formed of the group of unit heads corresponds to the maximum recording width of the recording medium can be used.

Figure 3:
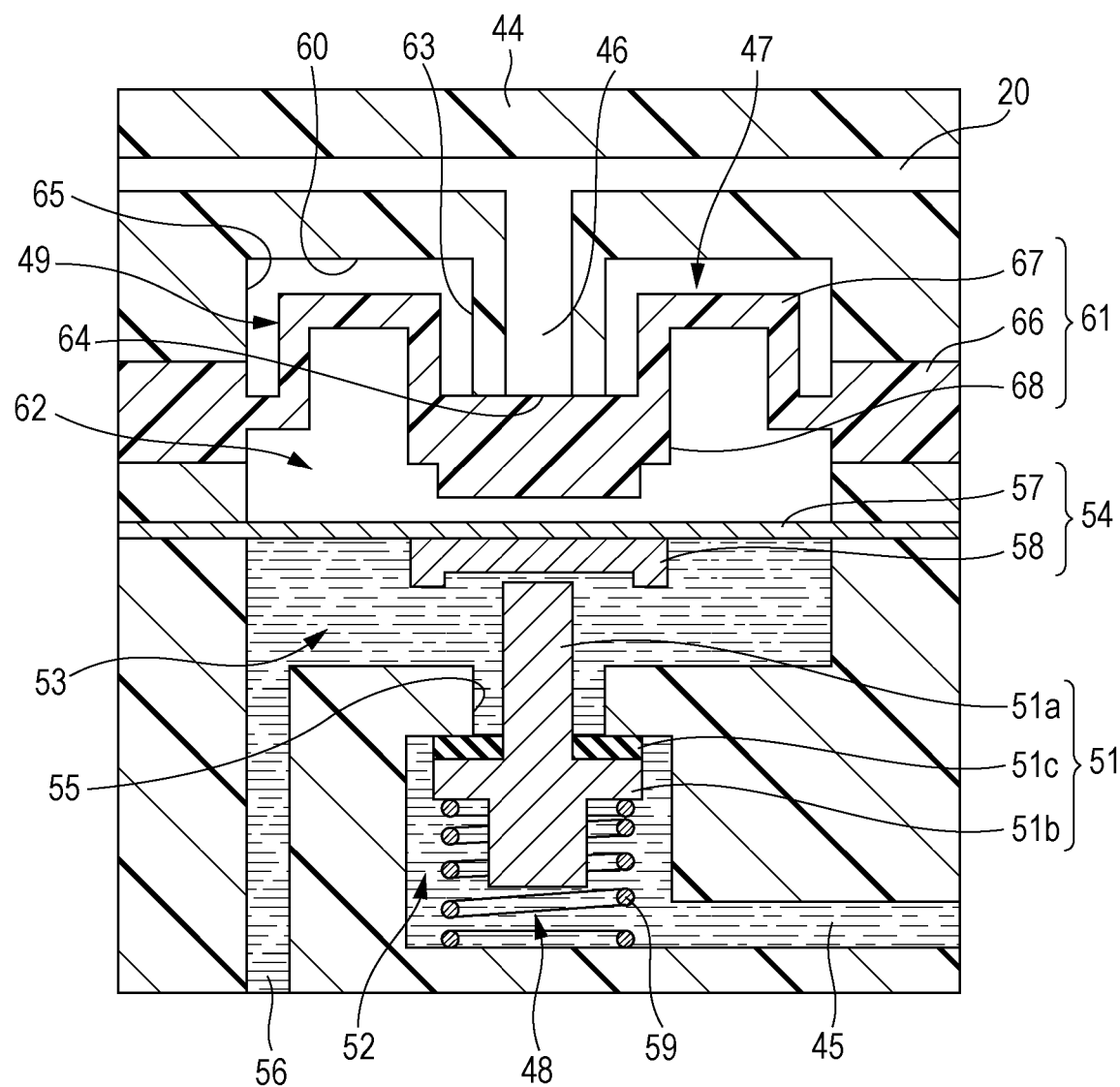
FIG. 3 is a diagram illustrating a configuration of a valve mechanism.
Figure 4:
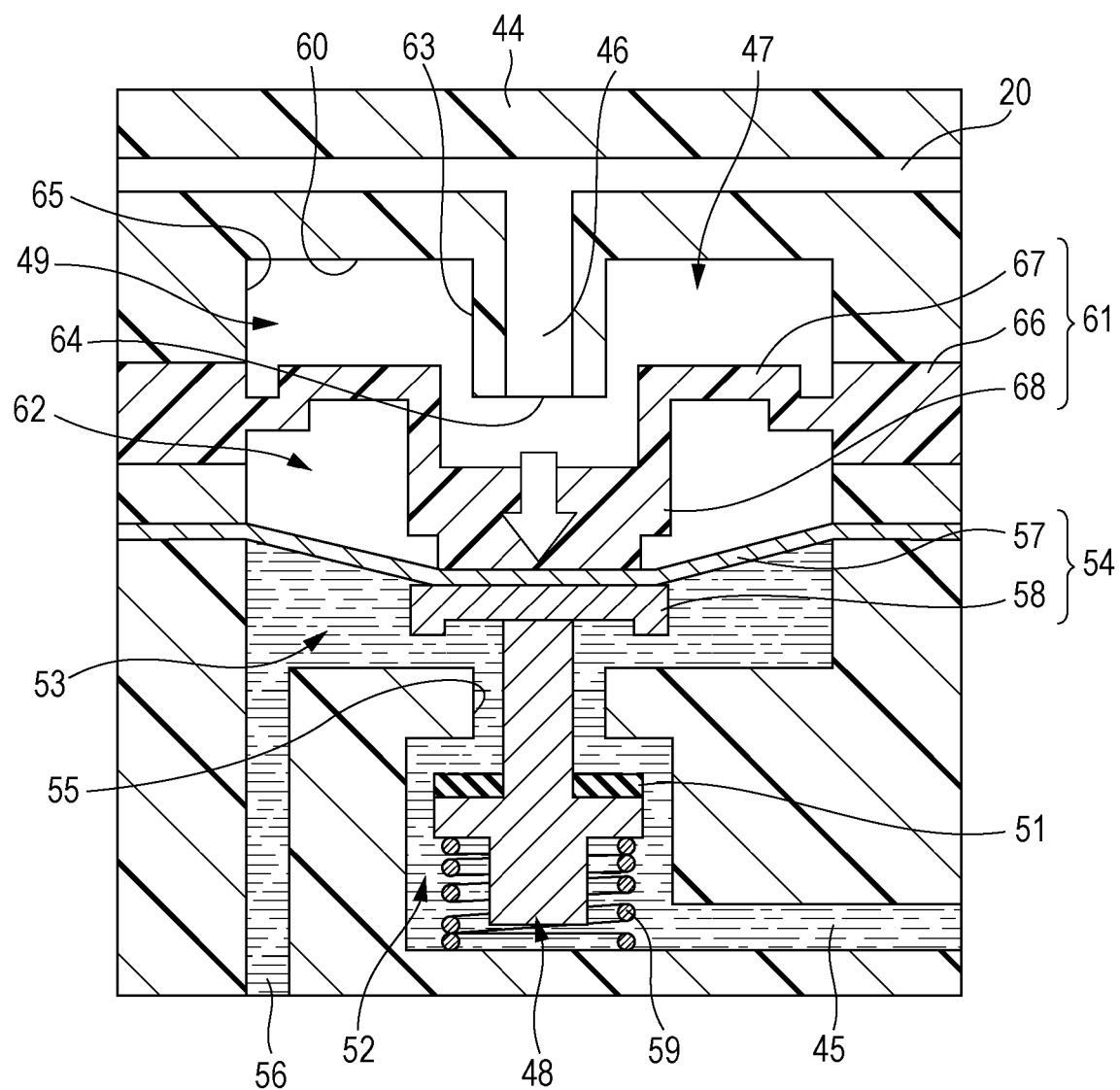
FIG. 4 is a diagram illustrating a configuration of a valve mechanism.

FIGS. 3 and 4 are cross-sectional views illustrating configurations of a valve mechanism 48 and a forcible valve opening mechanism 49 of the valve unit 21. FIG. 3 shows a valve closed state, and FIG. 4 shows a valve open state in which a valve is opened by the forcible valve opening mechanism 49. The valve unit 21 of the present embodiment includes the gas flow path 20 and an ink flow path 45 (an example of the liquid flow path in the invention) disposed in a unit main body 44, for example, made of a synthetic resin. One end of the gas flow path 20 is connected to the pump unit 16, and the other end of the gas flow path 20 communicates with a degassing chamber of the filter unit 22, which will be described later. Further, one end of the ink flow path 45 communicates with the ink cartridge 13, and the other end of the ink flow path 45 communicates with an ink inlet path 69 of the filter unit 22 via the valve mechanism 48. The valve mechanism 48 is generally configured with the control valve 51 that opens and closes the ink flow path 45, a valve housing chamber 52 in which the control valve 51 is disposed, a control chamber 53 that communicates with the valve housing chamber 52, and a pressure receiving member 54 that seals an opening on the forcible valve opening mechanism 49 side of the control chamber 53. The valve housing chamber 52 and the control chamber 53 constitute part of the ink flow path 45. A partition wall that partitions the valve housing chamber 52 from the control chamber 53 has an inlet port 55 such that the valve housing chamber 52 communicates with the control chamber 53 via the inlet port 55. Further, the control chamber 53 communicates with the ink inlet path 69 of the filter unit 22 via an ink outlet path 56, which is part of the ink flow path 45.

The pressure receiving member 54 includes a film member 57 that elastically deforms toward the inside of the control chamber 53, that is, toward the control valve 51 in response to pressure change of the control chamber 53, and a pressure receiving plate 58 disposed on the inner side of the film member 57 (on the control chamber 53 side). The film member 57 seals the opening of the control chamber 53. That is, the film member 57 serves as a sealing member that seals part of the ink flow path 45. The film member 57 of the present embodiment is formed of, for example, a flexible film made of synthetic resin such as polyethylene terephthalate film or polypropylene film and an airtight layer formed by vapor deposition of silica ($SiO_2$) on a surface of the flexible film. That is, this airtight layer prevents permeation of gas through the film member 57. Further, this configuration also improves ink resistance of the film member 57. Accordingly, the film member 57 has high gas shielding properties per unit thickness compared with a flexible member 61, which is described later. The pressure receiving plate 58 is a plate member formed in a substantially circular shape in plan view and made of a material harder than the film member 57, and is provided at a position facing the control valve 51 in the control chamber 53. The pressure receiving plate 58 is configured to be displaced in response to deformation of the film member 57.

The control valve 51 is configured to switch between a valve open state that permits ink introduction from the valve housing chamber 52 to the control chamber 53, and a valve closed state which blocks ink introduction into the control chamber 53. The control valve 51 is biased by a bias member 59 toward the closed valve position when disposed in the valve housing chamber 52. The control valve 51 includes a cylindrical shaft 51$a$, a substantially disc-shaped flange 51$b$ which laterally protrudes from the middle of the longitudinal length of the shaft 51$a$, and a seal section 51$c$ disposed on a surface of the flange 51$b$, which faces the inlet port 55. A distal end of the shaft 51$a$ (an end on the distal side relative to the flange 51$b$) has an outer diameter smaller than an inner diameter of the inlet port 55, and the shaft 51$a$ is partially inserted into the control chamber 53 from the housing chamber 52 through the inlet port 55. Thus, a gap is formed between the shaft 51$a$ and the inner peripheral surface of the inlet port 55 so that ink from the ink cartridges 13 is introduced into the control chamber 53 therethrough. The flange 51$b$ is formed in a substantially disc-shape with a diameter larger than the inner diameter of the inlet port 55. The seal section 51$c$ disposed on the flange 51$b$ is made of, for example, an elastic material such as elastomer or silicone rubber. As shown in FIG. 3, in the valve closed state, the seal section 51$c$ is in contact with the periphery of opening of the inlet port 55 due to elasticity to thereby seal the periphery of opening of the inlet port 55 in a liquid-tight manner. That is, the inlet port 55, which is part of the ink flow path 45 is closed.

The bias member 59 abuts a surface of the flange 51$b$ on a side opposite to that facing the seal section 51$c$ in the control valve 51 and biases the entire control valve 51 toward the control chamber 53. Then, the bias member 59 is held at a closed valve position at which the seal section 51$c$ of the flange 51$b$ is closely in contact with the periphery of opening of the inlet port 55 until the pressure difference between the control chamber 53 and a space 62, described later, becomes a predetermined value due to ink consumption by the recording head 10, or a pressing force is applied from the forcible valve opening mechanism 49. At this closed valve position, the control valve 51 blocks inflow of ink from the valve housing chamber 52 into the control chamber 53.

When the control valve 51 is closed to block inflow of ink into the control chamber 53, ink is supplied from the ink cartridge 13 by pressurization by the pump unit 16. Accordingly, the pressure in the valve housing chamber 52 becomes higher than the pressure in the control chamber 53. On the other hand, as the recording head 10 consumes ink, the pressure in the control chamber 53 on the downstream side of the valve housing chamber 52 gradually decreases. Accordingly, pressure difference is generated between the control chamber 53 and a space outside the control chamber 53 with the pressure receiving member 54 interposed therebetween. Further, in the present embodiment, the space 62 outside the control chamber 53 with the pressure receiving member 54 interposed therebetween, that is, the space 62 between the pressure receiving member 54 and the flexible member 61 of the forcible valve opening mechanism 49, which is described later, is adjusted at an atmospheric pressure. By virtue of the pressure difference between the control chamber 53 and the space 62, the film member 57 of the pressure receiving member 54 elastically deforms toward the inside of the control chamber 53 to thereby press the pressure receiving plate 58 toward the control valve 51. Accordingly, the pressure receiving plate 58 presses the distal end of the shaft 51a of the control valve 51 which is in the closed valve position to thereby move the control valve 51 in an open direction, that is, toward the valve housing chamber 52 while resisting a resultant force of a biasing force of the bias member 59 applied to the control valve 51 and a pressure of ink from the ink cartridge 13. Thus, the seal section 51c of the flange 51b is separated from the periphery of opening of the inlet port 55, which causes the control valve 51 to be displaced to the open valve position and to assume the valve open state in which the sealed state is released. Further, as described later, even when a pressing force is applied from the flexible member 61 of the forcible valve opening mechanism 49, the valve closed state can be forcibly changed to the valve open state regardless of pressure in the control chamber 53.

In the valve open state described above, inflow of ink from the valve housing chamber 52 into the control chamber 53 via the inlet port 55 is permitted. After flowing into the control chamber 53, ink flows into the ink inlet path 69 of the filter unit 22 via the ink outlet path 56. As ink flows from the housing chamber 52 into the control chamber 53 after the valve opens, pressure in the control chamber 53 gradually increases accordingly. With an increase of the inner pressure of the control chamber 53, the pressure receiving member 54 is gradually displaced from the bottom side of the control chamber 53, that is, from the control valve 51 side toward the opening surface. At last, the control valve 51 is displaced to the closed valve position by virtue of the biasing force of the bias member 59 and the pressure of ink from the ink cartridge 13. Accordingly, the seal section 51c of the flange 51b is closely in contact with the periphery of opening of the inlet port 55 to close the inlet port 55, and thus the control valve 51 assumes the valve closed state in which inflow of ink into the control chamber 53 is blocked. Further, the valve closed state also occurs when the pressing force of the flexible member 61 is released from the valve open state, which is held by the pressing force of the flexible member 61 of the forcible valve opening mechanism 49.

In the present embodiment, the forcible valve opening mechanism 49 is disposed at a position facing the pressure receiving member 54 of the valve mechanism 48. The forcible valve opening mechanism 49 of the present embodiment includes the gas chamber 47 and the flexible member 61. The gas chamber 47 is a recess depressed from a surface facing the valve mechanism 48 toward the opposite surface. That is, the gas chamber 47 includes a facing surface 60 that faces the pressure receiving member 54 of the valve mechanism 48, and a side surface 65 extending from an outer peripheral edge of the facing surface 60 toward the valve mechanism 48. Further, an opening of the gas chamber 47 facing the valve mechanism 48 is sealed by the flexible member 61. Accordingly, the flexible member 61 partitions part of the gas chamber 47. A cylindrical protrusion 63 is formed at a substantially center part of the facing surface 60 in the gas chamber 47 to protrude from the facing surface 60 toward the valve mechanism 48, in other words, towards the flexible member 61. Inside the protrusion 63 is a vent path 46 in which gas can be distributed. One end of the vent path 46, that is, an end facing away from the gas chamber 47 communicates with the gas flow path 20. Further, the other end of the vent path 46 is open to an end face of the protrusion 63 as a vent hole 64 (an example of distribution site in the invention). That is, the gas chamber 47 communicates with the gas flow path 20 via the vent path 46. Accordingly, as gas flows into and out of the gas chamber 47 in response to actuation of the pump unit 16, the pressure inside the gas chamber 47 can be increased and decreased. In addition, although the gas chamber 47 is originally designed as a space that allows gas, that is, air to flow therein, it also can be configured as a space filled with liquid as described later. That is, the gas chamber 47 can also be regarded as a pressure adjustment chamber that causes the flexible member 61 to be displaced by pressure change inside the gas chamber 47.

The flexible member 61 is a member made of an elastic material that is elastically deformable in response to pressure change inside the gas chamber 47. An area of the flexible member 61 as viewed in an open/close direction of the control valve 51 is larger than an opening area of the recess of the gas chamber 47 to a degree that can sufficiently cover the opening of the recess of the gas chamber 47. The flexible member 61 is fixed to the unit main body 44 at a position outside the opening of the recess of the gas chamber 47. A portion fixed to the unit main body 44 and regulated from moving is a regulation section 66. Further, the flexible member 61 includes, a thin wall portion 67 (corresponding to a first portion in the invention) and a thick wall portion 68 (corresponding to a second portion in the invention portion) having a thickness larger than that of the thin wall portion 67 in a movable portion located inside the regulation section 66, that is, a portion that seals the gas chamber 47 and actually elastically deforms in response to pressure change inside the gas chamber 47. The thin wall portion 67 has a reduced thickness to facilitate deformation in response to pressure change in the gas chamber 47, and accordingly facilitates gas permeation. On the other hand, since the thick wall portion 68 has the thickness larger than the thin wall portion 67, it does not easily permeate gas compared with the thin wall portion 67. The thick wall portion 68 is provided at a position facing the vent hole 64 in the center part of the flexible member 61 and the pressure receiving member 54 of the valve mechanism 48, and serves as a contact section in the invention.

When the pressure inside the gas chamber 47 is decreased by the pump unit 16, that is, decreased to a pressure lower than that in the space 62 outside the gas chamber 47 with the flexible member 61 interposed therebetween, the movable portion of the flexible member 61 is displaced toward the inside of the gas chamber 47, that is, toward the facing surface 60. In the state in which the pressure inside the gas chamber 47 is decreased, as shown in FIG. 3, the thick wall portion 68 abuts an end face (in other words, protruding end face) of the protrusion 63 to which the vent hole 64 is open so as to close the vent hole 64 to thereby assume an airtightly sealed state. In the present embodiment, the unit main body 44 is a type of another object in the invention, and an opening of the vent hole 64 on the end face of the protrusion 63 is a type of another object in a narrower sense than the unit main body 44. As described above, since the opening of the vent hole 64, that is, the end face of the protrusion 63 protrudes from the facing surface 60 of the gas chamber 47 toward the flexible member 61, a portion to be in contact with the thick wall portion 68 is limited to the opening of the vent hole 64 to thereby further increase a contact pressure. Accordingly, sealing of the vent hole 64 by the thick wall portion 68 can be improved. Further, since the thick wall portion 68 has an increased thickness compared with the thin wall portion 67, it does not easily allow gas permeation. Accordingly, during depressurization, gas is prevented from flowing out from the space 62 into the gas chamber 47 permeating through the thick wall portion 68. On the other hand, since the thin wall portion 67 has a reduced thickness compared with the thick wall portion 68, it easily deforms in response to pressure change in the gas chamber 47. Accordingly, the function of the flexible member 61 can be more effectively performed. That is, in the present embodiment, an operation to forcibly open the control valve 51 of the valve mechanism 48 can be more reliably and smoothly performed. Further, the sealed state of the vent hole 64 refers to a state where a portion in which the opening of the vent hole 64 overlaps with the flexible member 61 continuously surrounds the vent hole 64 in an annular shape.

In the present embodiment, when a pressure inside the gas chamber 47 is equal to a pressure inside the space 62, that is, when neither depressurization nor pressurization inside the gas chamber 47 is performed by the pump unit 16, the thick wall portion 68 is configured to abut the periphery of opening of the vent hole 64. Accordingly, the flexible member 61 does not need to be largely deformed to cause the thick wall portion 68 to abut the opening of the vent hole 64, compared with a configuration in which the thick wall portion 68 does not abut the opening of the vent hole 64, that is, the thick wall portion 68 is separated from the opening of the vent hole 64 when neither depressurization nor pressurization is performed. Accordingly, a so-called creep, which is deformation of the thin wall portion 67 that does not return to the original shape, can be reduced compared with the case where depressurization of the gas chamber 47 is held for a long period of time in order to cause the thick wall portion 68 to abut the opening of the vent hole 64 in a configuration in which the thick wall portion 68 does not abut the opening of the vent hole 64 when neither depressurization nor pressurization is performed. In the present embodiment, while the thick wall portion 68 abuts and seals the opening of the vent hole 64, the thin wall portion 67 is flexed toward the facing surface 60 conforming to the shape of the recess of the gas chamber 47. Here, it is preferred that one of the members, that is, a portion of the gas chamber 47 to be in contact with the flexible member (that is, opening of the vent hole 64) and the flexible member 61, has smoothness higher than the other member in a region to be in contact with the other member. For example, a lapping process is applied to an end face of the protrusion 63 to which the vent hole 64 is open, while a surface roughening process is applied to the surface of the flexible member 61 so that the smoothness of the opening of the vent hole 64 becomes higher than the surface smoothness of the flexible member 61. Accordingly, since the smoothness of a contact portion of one member is higher than that of the other member, both members can be more smoothly separated from each other in release of the sealed state while ensuring the sealing properties. That is, it is possible to reduce occurrence of failure that both members are so closely attached to each other that the sealed state cannot be released.

When the pressure inside the gas chamber 47 is increased by the pump unit 16, as shown in FIG. 4, the movable portion of the flexible member 61 is displaced toward the outside of the gas chamber 47, that is, toward the valve mechanism 48. Then, when the pressure inside the gas chamber 47 is increased to a predetermined pressure, the thick wall portion 68 abuts the film member 57 (an example of another object in the invention) of the pressure receiving member 54 in the valve mechanism 48 to press the pressure receiving member 54 toward the control valve 51. By adjusting the pressure in the gas chamber 47, the control valve 51 can be forcibly opened regardless of the pressure in the control chamber 53. In the present embodiment, a portion of the thick wall portion 68 to be in contact with an end face of the protrusion 63 and a portion to be in contact with the film member 57 each serve as a contact section in the invention.

As shown in FIG. 2, the filter unit 22 includes the ink inlet path 69, the degassing chamber 70, a filter chamber (more specifically, an upper filter chamber 72 and a lower filter chamber 73), the filter 74, and the ink supply path 75, which are disposed therein. The ink inlet path 69 communicates with the ink flow path 45 of the valve unit 21 so that ink from the ink outlet path 56 of the ink flow path 45 is introduced. The ink introduced into the ink inlet path 69 flows into the filter chamber. The filter chamber is composed of the upper filter chamber 72 and the lower filter chamber 73. Further, the filter 74 is disposed to separate the filter chambers 72 and 73. The upper filter chamber 72 is a space that expands from the upper side, that is, a side on which the filter 74 is not disposed, toward the lower side, that is, a side on which the filter 74 is disposed. The filter 74 is positioned to close the flow path of the filter unit 22 and captures air bubbles or foreign substances contained in the ink flowing into the filter chamber. The lower filter chamber 73 is a space that contracts from the upper side, that is, a side on which the filter 74 is disposed, toward the lower side, that is, a side on which the filter 74 is not disposed. The bottom of the lower filter chamber 73 communicates with the ink supply path 75. The ink supply path 75 is diverged from the lower filter chamber 73 such that each branch communicates with the introduction port 43 of the recording head 10 on the bottom of the filter unit 22.

The degassing chamber 70 is a space disposed on the upper side of the upper filter chamber 72. The degassing chamber 70 and the upper filter chamber 72 are separated from each other by a permeation film 76. Accordingly, the top surface of the upper filter chamber 72 is formed of the permeation film 76. The permeation film 76 is an air-liquid separation film that permits permeation of gas (air) but prohibits permeation of liquid such as ink, and is made of, for example, high molecular material. An air bubble contained in the ink flowing into the upper filter chamber 72 from the ink inlet path 69 is captured by the filter 74, and accumulates on the top surface of the upper filter chamber 72 due to a buoyant force. Then, as the air bubble which accumulates on the top surface of the upper filter chamber 72 permeates through the permeation film 76, it is discharged into the degassing chamber 70. The degassing chamber 70 communicates with the gas flow path 20 of the valve unit 21.

In the above configuration, in initial filling operation in which ink is introduced into the flow path in the recording head 10, or in maintenance operation in which ink or air bubble contained in the flow path in the recording head 10 is forcibly discharged from the nozzle 30, pressurization operation is performed to increase pressure in the ink cartridge 13 and the gas chamber 47 by the pump unit 16. In this operation, as shown in FIG. 4, the flexible member 61 is displaced toward the valve mechanism 48 with an increase in pressure inside the gas chamber 47, and the thick wall portion 68 abuts the film member 57 of the pressure receiving member 54 to press the pressure receiving member 54 toward the control valve 51. Accordingly, the pressure receiving member 54 presses the control valve 51 which is in the closed valve position to thereby move the control valve 51 toward the valve housing chamber 52 while resisting a resultant force of a biasing force of the bias member 59 applied to the control valve 51 and a pressure of ink from the ink cartridge 13 so that the control valve 51 assumes the valve open state. As a result, the control chamber 53 and the valve housing chamber 52 communicate with each other via the inlet port 55 so that ink from the ink cartridge 13 flows into the ink inlet path 69 of the filter unit 22 through the ink flow path 45, passes through the filter 74, and then flows into the flow path in the recording head 10 through the ink supply path 75. Accordingly, the initial filling operation or maintenance operation can be performed. In such an initial filling operation or maintenance operation, the pressurized state in the gas chamber 47 is maintained until these operations are completed. Here, the pressure inside the gas chamber 47 is preferably maintained as constant as possible.

When the initial filling operation or maintenance operation is completed, a pressurization operation by the pump unit 16 stops, and the pressure inside the gas chamber 47 returns to an initial state, that is, to a pressure prior to the pressurization operation and depressurization operation performed by the pump unit 16. Thus, the flexible member 61 is displaced from the valve mechanism 48 side toward the facing surface 60 of the gas chamber 47, separating from the film member 57. Accordingly, the pressure receiving member 54 is displaced from the bottom side of the control chamber 53, that is, from the control valve 51 side toward the opening surface of the control chamber 53, that is, toward the forcible valve opening mechanism 49 to return to the original state. As a result, the control valve 51 is closely in contact with the periphery of opening of the inlet port 55 to thereby close the inlet port 55, and thus assumes the valve closed state in which inflow of ink from the housing chamber 52 into the control chamber 53 is blocked.

Next, the degassing operation in which gas contained in ink is removed will now be described. As described above, an air bubble captured by the filter 74 accumulates on the top surface of the upper filter chamber 72. In order to remove such an air bubble, the degassing operation is performed by depressurization operation of the pump unit 16 so that the depressurized state of the degassing chamber 70 is maintained. The degassing operation is performed at a desired timing, for example, immediately after applying power to the printer 1 or in a stand-by state in which printing operation is not performed. In the degassing operation, the pump unit 16 performs the depressurization operation via the gas flow path 20. As the pump unit 16 suctions air, pressure in the gas chamber 47 and the degassing chamber 70 which communicate with the gas flow path 20 is reduced.

As the pressure inside the gas chamber 47 is reduced, the flexible member 61 is displaced toward the inside of the gas chamber 47. As shown in FIG. 3, the thick wall portion 68 abuts the opening of the vent hole 64 to seal the vent hole 64. In the present embodiment, since the thick wall portion 68 is configured to abut the opening of the vent hole 64 due to elasticity of the flexible member 61 when neither depressurization nor pressurization inside the gas chamber 47 is performed, the thick wall portion 68 maintains to seal the opening of the vent hole 64 during depressurization. Then, while the depressurized state is maintained, an air bubble accumulating on the top surface of the upper filter chamber 72, that is, air gradually permeates through the permeation film 76 and moves into the degassing chamber 70. The air which has moved into the degassing chamber 70 is discharged outside via the gas flow path 20. In order to perform the degassing operation more effectively, it is preferred to maintain the degassing chamber 70 at the depressurized state as long as possible. Further, the mechanism for performing such a degassing operation is not limited to that illustrated. For example, in a liquid ejecting head configured such that ink circulates between the liquid ejecting head and a liquid storage container, a degassing mechanism such as that described above (that is, a permeation film that partitions part of the flow path or the like in which liquid flows and a degassing chamber that communicates with the gas flow path 20) can be provided in both the inbound and outbound flow paths.

For the conventional flexible member, a thin material that easily deforms conforming to the pressure change has been used. In addition, any configuration for sealing the opening of the vent hole of the gas chamber has not been used. Accordingly, there is a problem that gas may permeate through the flexible member, which makes it difficult to maintain the depressurized state. The flexible member 61 of the invention, however, is configured to abut the opening of the vent hole 64 for sealing the vent hole 64 when the pressure in the gas chamber 47 is reduced. Accordingly, in the flexible member 61, a concern about gas permeation is actually limited to a region corresponding to the vent hole 64. That is, by creating seal as described above, a region having a concern about gas permeation in the flexible member 61 is decreased. Accordingly, the depressurized state can be maintained for a longer period of time compared with the conventional configuration in which a distribution site such as the vent hole 64 is not sealed by a flexible member. Further, the flexible member 61 in the present embodiment, which includes the thin wall portion 67 that easily allows gas permeation and the thick wall portion 68 that does not easily allow gas permeation, seals the vent hole 64 by the thick wall portion 68. Accordingly, the flexible member 61 further prevents occurrence of gas permeation, improving sealing properties. As a result, the depressurized state can be maintained for a longer period of time.

During pressurization, since sealing is created by the flexible member 61 being in contact with the film member 57, which is a sealing member that seals part of the ink flow path 45, an area of the flexible member 61 which allows gas permeation decreases. Accordingly, the pressurized state can be maintained for a longer period of time. That is, in the present embodiment, since the film member 57 does not easily allow gas permeation due to having an airtight layer, gas permeation can be more reliably reduced when sealing is created by the flexible member 61 being in contact with the film member 57, and the pressurized state can be maintained by a pressure which is as constant as possible. Moreover, since the sealing member for sealing the liquid flow path is provided as separate from the flexible member, each of the flexible member and the sealing member can perform their functions more effectively compared with a configuration in which a single member has both functions. That is, the flexible member exhibits the function of sealing another object by the contact section being in contact therewith by deforming in response to pressure change in the gas chamber, while the sealing member exhibits ink resistance and airtightness.

According to the valve unit 21 of the invention, gas permeation of the flexible member 61 can be reduced to maintain the depressurized state or pressurized state for a longer period of time. Accordingly, in the recording head 10 into which ink supplied from the valve unit 21 is introduced and the printer 1 having the same, the initial filling operation, maintenance operation, or degassing operation can be more reliably performed. A target that the flexible member 61 abuts for sealing may be only the vent hole 64, or only the film member 57.

Figure 5:
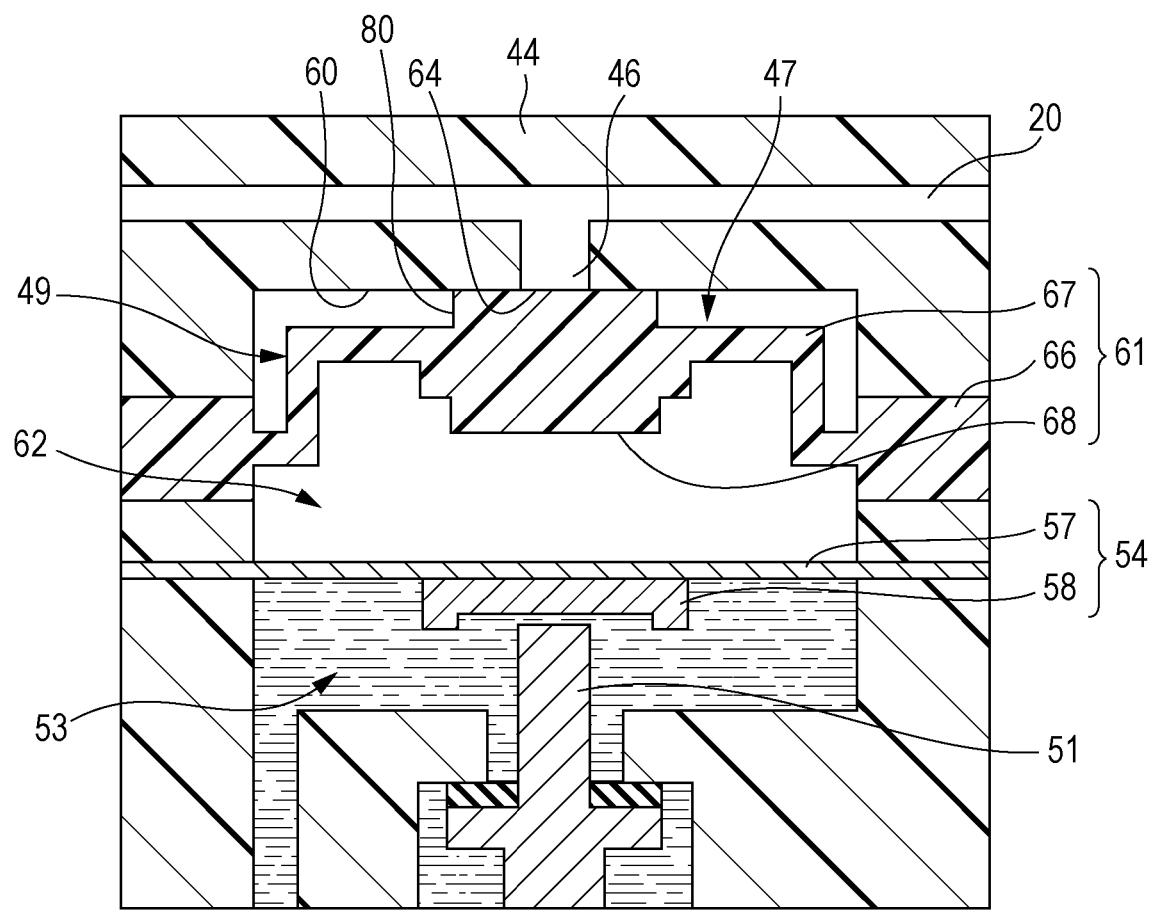
FIG. 5 is a diagram illustrating a configuration of a valve mechanism and a forcible valve opening mechanism according to a second embodiment.

FIG. 5 is a diagram illustrating a configuration of a valve mechanism 48 and a forcible valve opening mechanism 49 according to a second embodiment. The aforementioned first embodiment is configured such that the protrusion 63 protrudes from the facing surface 60 of the gas chamber 47 toward the flexible member 61, and the thick wall portion 68 of the flexible member 61 abuts the end face of the protrusion 63. However, the invention is not limited thereto. In the present embodiment, the protrusion 63 is not provided on the facing surface 60 of the gas chamber 47, and the vent hole 64 is open to a flat facing surface 60. Further, the flexible member 61 is provided with a protrusion 80 which protrudes from the thick wall portion 68 toward the facing surface 60. As the pressure in the gas chamber 47 is reduced, the end face of the protrusion 80 provided on the thick wall portion 68 abuts the opening of the vent hole 64 to thereby seal the vent hole 64. In the present embodiment, a portion of the protrusion 80 which is to be in contact with the opening of the vent hole 64 serves as a contact section in the invention. In the configuration of the present embodiment as well, during depressurization of the gas chamber 47, a contact section between the opening of the vent hole 64 and the flexible member 61 is limited to the end face of the protrusion 80, which increases a contact pressure. Accordingly, gas permeation is further reduced, and sealing properties can be improved. Further, it is also possible to provide the protrusion 63 in the gas chamber 47 and the protrusion 80 on the flexible member 61 so that these protrusions can be in contact with each other. The other configurations are the same as those of the first embodiment.

Figure 6:
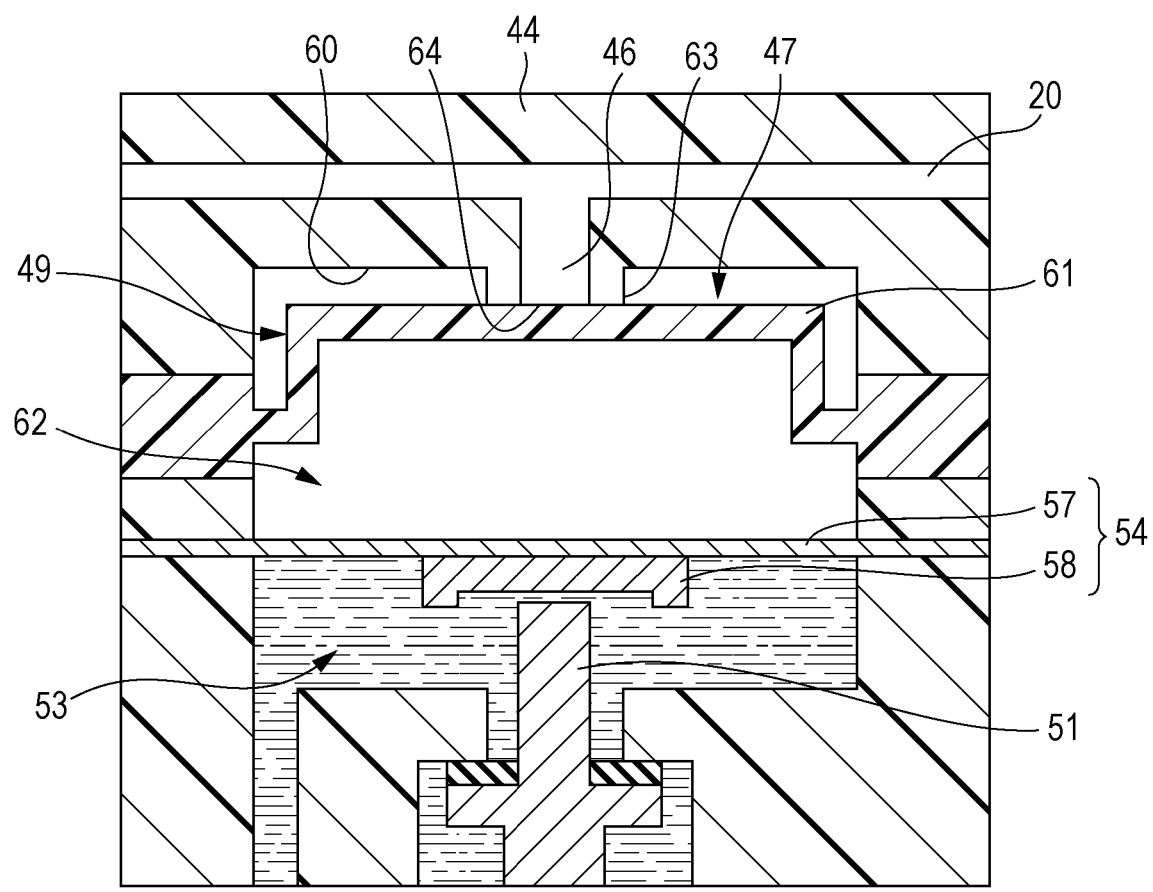
FIG. 6 is a diagram illustrating a configuration of a valve mechanism and a forcible valve opening mechanism according to a third embodiment.
Figure 7:
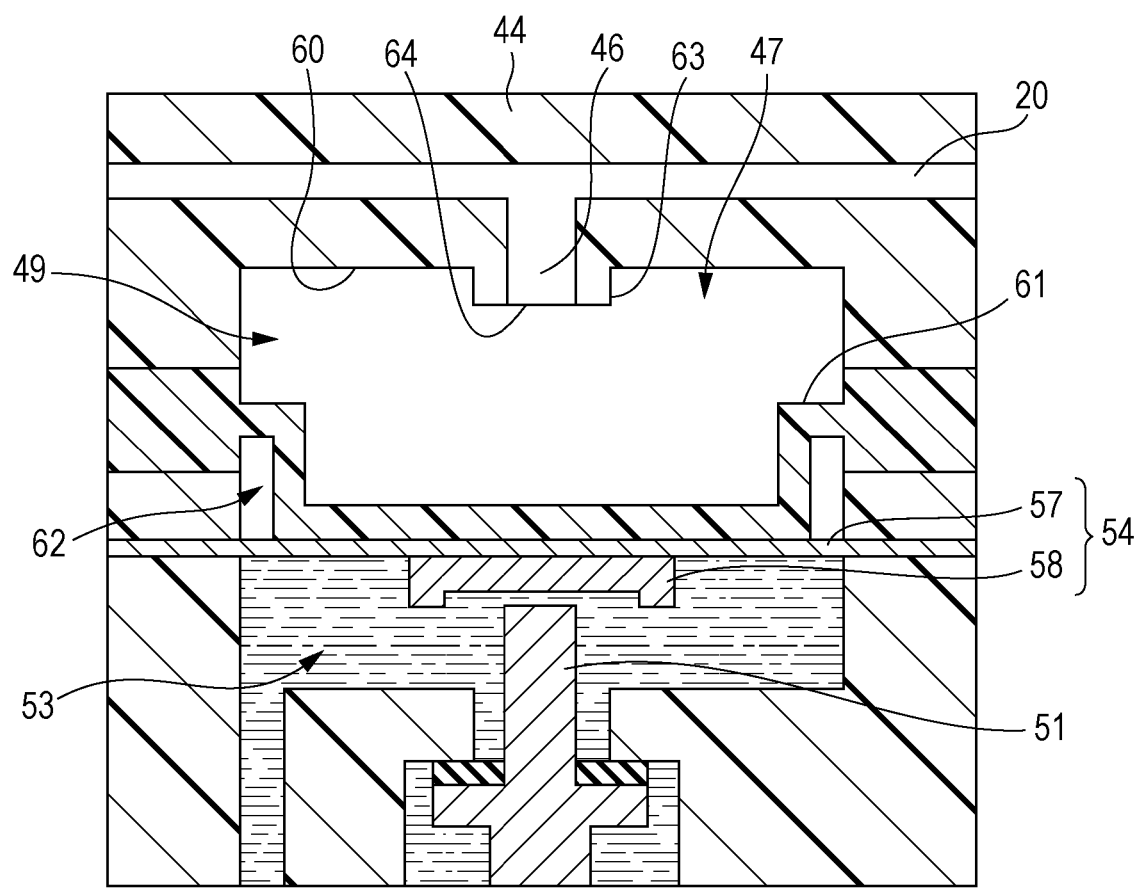
FIG. 7 is a diagram illustrating a configuration of a valve mechanism and a forcible valve opening mechanism according to the third embodiment.

FIGS. 6 and 7 are views illustrating configurations of the valve mechanism 48 and the forcible valve opening mechanism 49 in a third embodiment. FIG. 6 shows a depressurized state, and FIG. 7 shows a pressurized state. The present embodiment differs from the first embodiment in that a portion of the flexible member 61 which seals the gas chamber 47, that is, a movable portion located inside the regulation section 66 does not have a portion corresponding to the thick wall portion 68 in the first embodiment, and is formed to have a generally constant thickness. The thickness of the movable portion of the present embodiment corresponds to, for example, the thickness of the thin wall portion 67 of the first embodiment. In the present embodiment, as shown in FIG. 6, when the gas chamber 47 is depressurized, a movable portion of the flexible member 61 abuts the opening of the vent hole 64 on the end face of the protrusion 63 provided in the gas chamber 47 to thereby seal the vent hole 64. During the depressurization, a contact section between the opening of the vent hole 64 and the flexible member 61 is limited to the end face of the protrusion 63, which increases a contact pressure per unit area. Accordingly, gas permeation is further reduced, and sealing properties can be improved.

In the present embodiment, as shown in FIG. 7, when the gas chamber 47 is pressurized, sealing is created by the movable portion of the flexible member 61 being in contact with the film member 57, which is a sealing member. Accordingly, an area of the flexible member 61 which allows gas permeation decreases. Here, a contact area between the movable portion of the flexible member 61 and the film member 57 is preferably increased. Accordingly, gas is prevented from flowing out from the gas chamber 47 into the space 62 permeating through the flexible member 61. As a result, the pressurized state of the gas chamber 47 can be maintained for a longer period of time. That is, in the present embodiment, since the film member 57 does not easily allow gas permeation due to having an airtight layer, gas permeation through the flexible member 61 can be more reliably reduced when sealing is created by the flexible member 61 being in contact with the film member 57, and the pressurized state can be maintained by a pressure which is as constant as possible. The other configurations are the same as those of the first embodiment.

Figure 8:
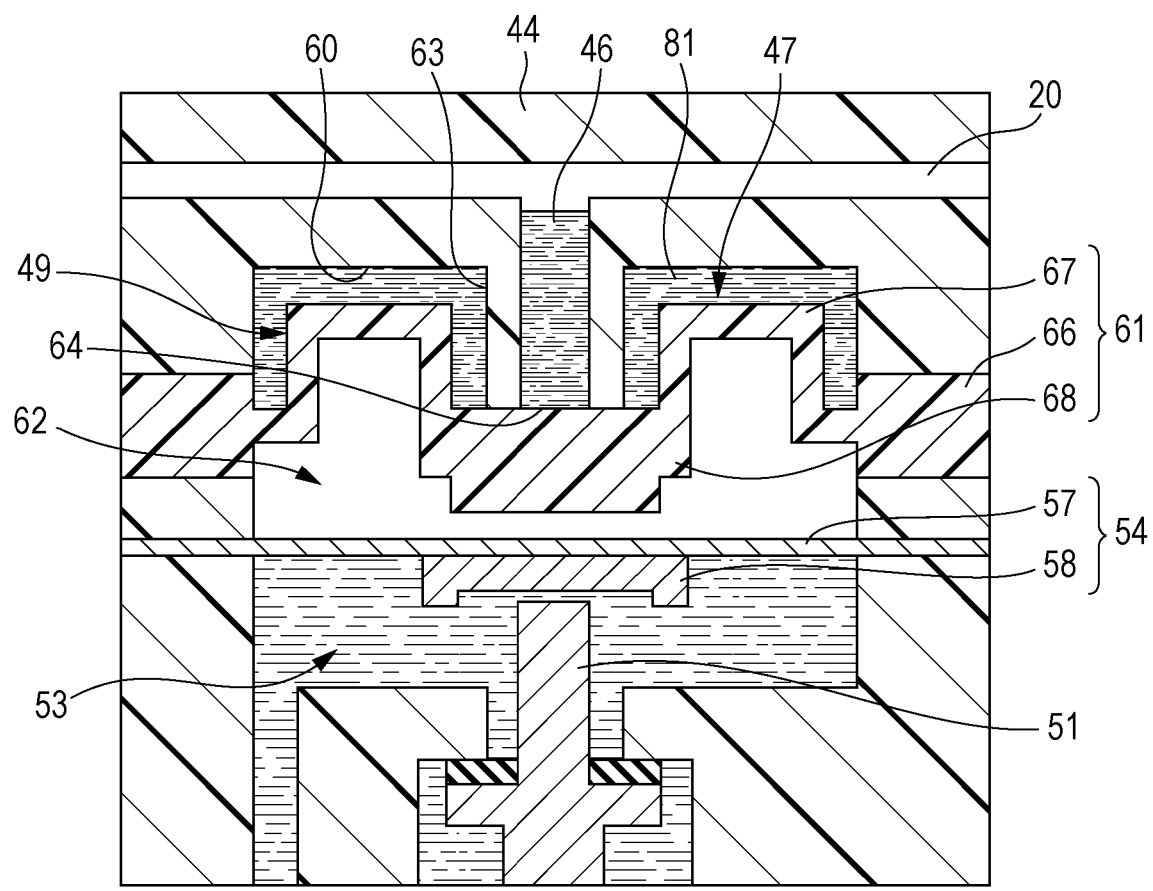
FIG. 8 is a diagram illustrating a configuration of a valve mechanism and a forcible valve opening mechanism according to a fourth embodiment.
Figure 9:
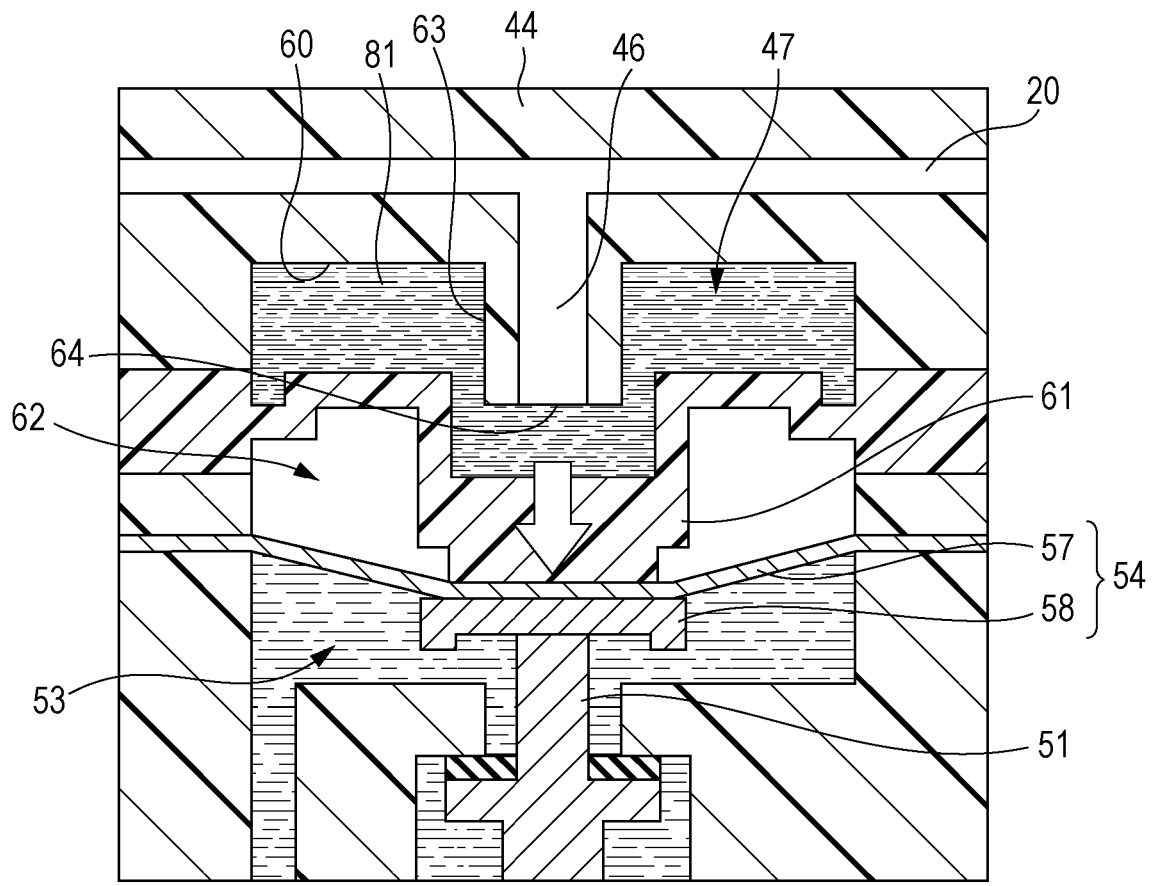
FIG. 9 is a diagram illustrating a configuration of a valve mechanism and a forcible valve opening mechanism according to the fourth embodiment.

FIGS. 8 and 9 are views illustrating configurations of the valve mechanism 48 and the forcible valve opening mechanism 49 in a fourth embodiment. FIG. 8 shows a depressurized state, and FIG. 9 shows a pressurized state. In the present embodiment, the gas chamber 47 is filled with liquid, which is a filling liquid 81 such that one surface of the flexible member 61, that is, a surface of the movable portion which faces the gas chamber 47 is covered with the filling liquid 81. Preferably, the filling liquid 81 is liquid such as silicone oil, which is less likely to chemically react with the flexible member 61, allows less gas to permeate therethrough, exhibits less change in viscosity in response to temperature change, and exhibits volatility as low as possible. In the present embodiment, since the gas chamber 47 is filled with the filling liquid 81, a surface of the movable portion of the flexible member 61 which faces the gas chamber 47 is not directly in contact with gas during depressurization and pressurization of the gas chamber 47. Accordingly, permeation of gas through the flexible member 61 can be further reduced. As a result, the depressurized state or pressurized state of the gas chamber 47 can be maintained for a longer period of time. The other configurations are the same as those of the first embodiment.

Figure 10:
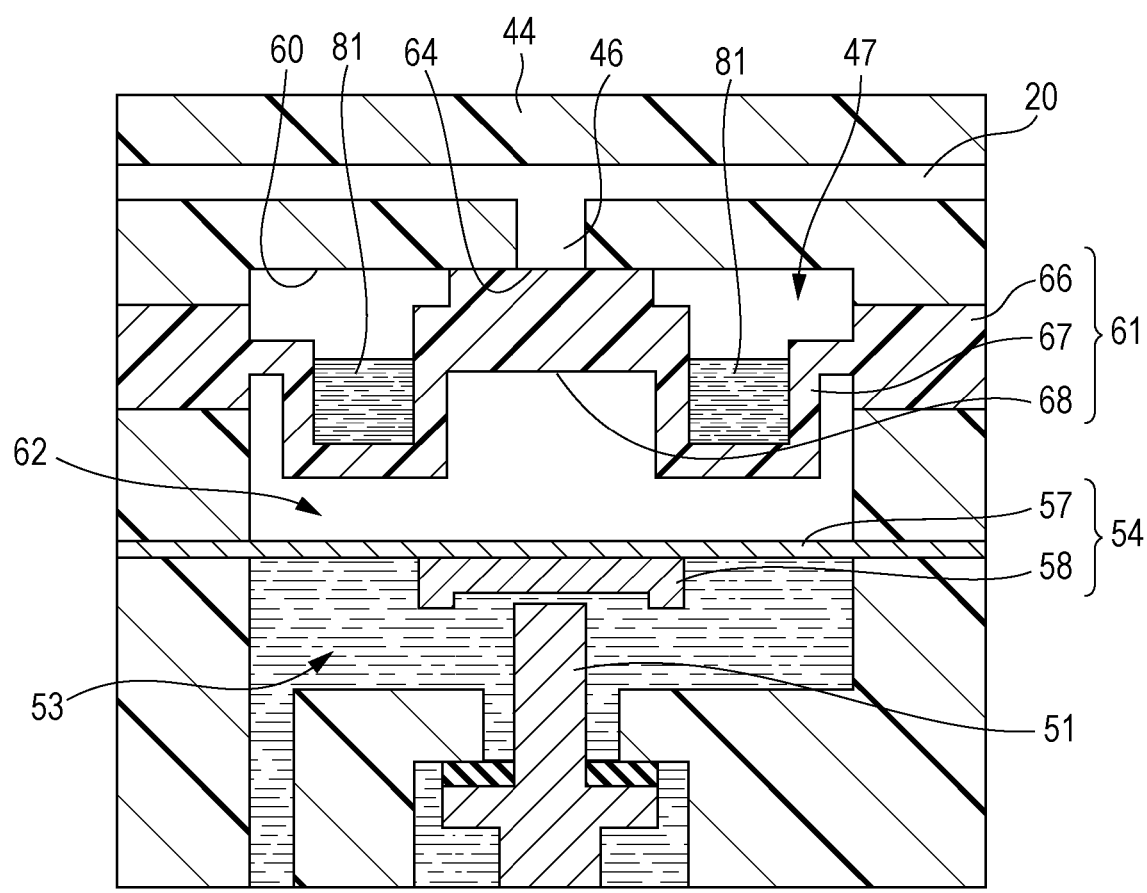
FIG. 10 is a diagram illustrating a configuration of a valve mechanism and a forcible valve opening mechanism according to a modified example of the fourth embodiment.
Figure 11:
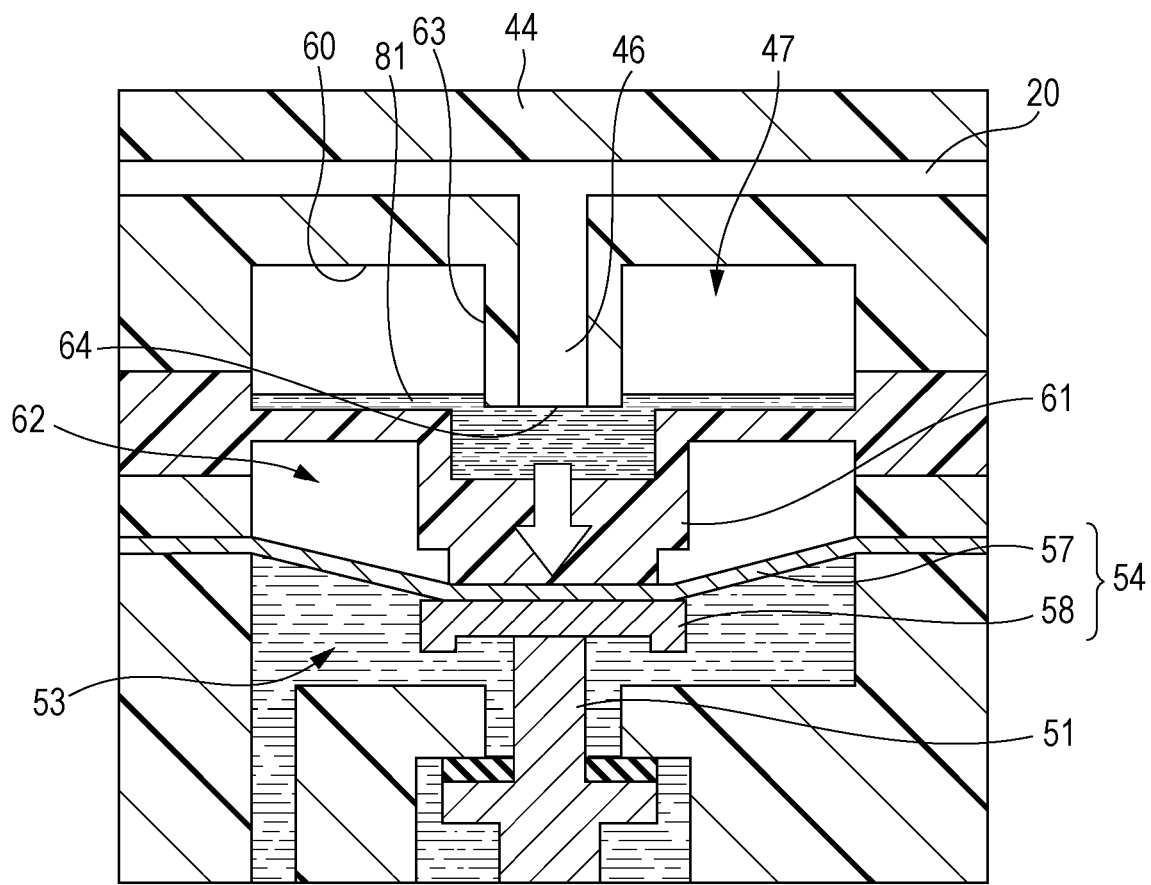
FIG. 11 is a diagram illustrating a configuration of a valve mechanism and a forcible valve opening mechanism according to a modified example of the fourth embodiment.

FIGS. 10 and 11 are views illustrating configurations of the valve mechanism 48 and the forcible valve opening mechanism 49 in a modified example of the fourth embodiment. FIG. 10 shows a depressurized state, and FIG. 11 shows a pressurized state. The filling liquid 81 can be configured to cover at least part of the flexible member 61 during depressurization or pressurization of the gas chamber 47. In this modified example, during depressurization of the gas chamber 47, only the thin wall portion 67 is covered with the filling liquid 81. Thus, in the configuration in which the filling liquid 81 partially covers the flexible member 61, a region in the flexible member 61 through which gas permeates can also be reduced. Accordingly, gas permeation through the flexible member 61 can be reduced. The other configurations are the same as those of the first embodiment.

Figure 12:
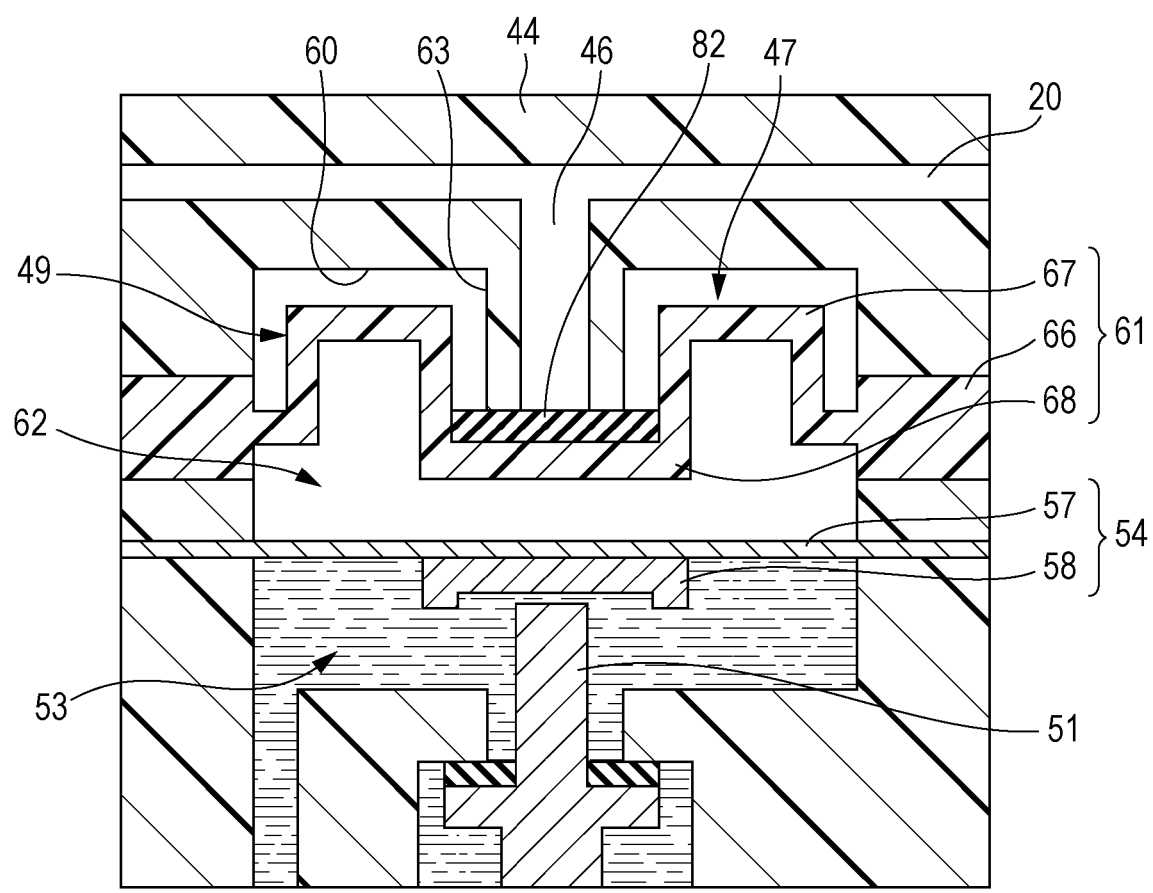
FIG. 12 is a diagram illustrating a configuration of a valve mechanism and a forcible valve opening mechanism according to a fifth embodiment.

FIG. 12 is a diagram illustrating a configuration of the valve mechanism 48 and the forcible valve opening mechanism 49 according to a fifth embodiment. In the figure, the gas chamber 47 in the depressurized state is illustrated. In the present embodiment, a shielding member 82 that reduces gas permeation is disposed on the contact section of the flexible member 61 which abuts the opening of the vent hole 64. The shielding member 82 is a plate-shaped member having an area which is approximately the same as or larger than that of the opening of the vent hole 64, and made of a material having high gas shielding properties per unit thickness compared with the flexible member 61. The shielding member 82 may be made of a material having high shielding properties against gas such as synthetic resin or metal, and is preferably made of a material having elasticity such as butyl rubber in order to ensure higher airtightness when it is in contact with the opening of the vent hole 64. Further, the shielding member 82 may be provided in the contact section of the flexible member 61 on at least one of the surface facing the gas chamber 47 and the surface facing away from the gas chamber 47. By providing the shielding member 82 in the contact section of the flexible member 61, the flexible member 61 can reduce gas permeation therethrough while reducing the thickness of the contact section. Accordingly, the flexible member 61 can easily deform in response to pressure change in the gas chamber 47, and contributes to downsizing of the forcible valve opening mechanism 49.

Figure 13:
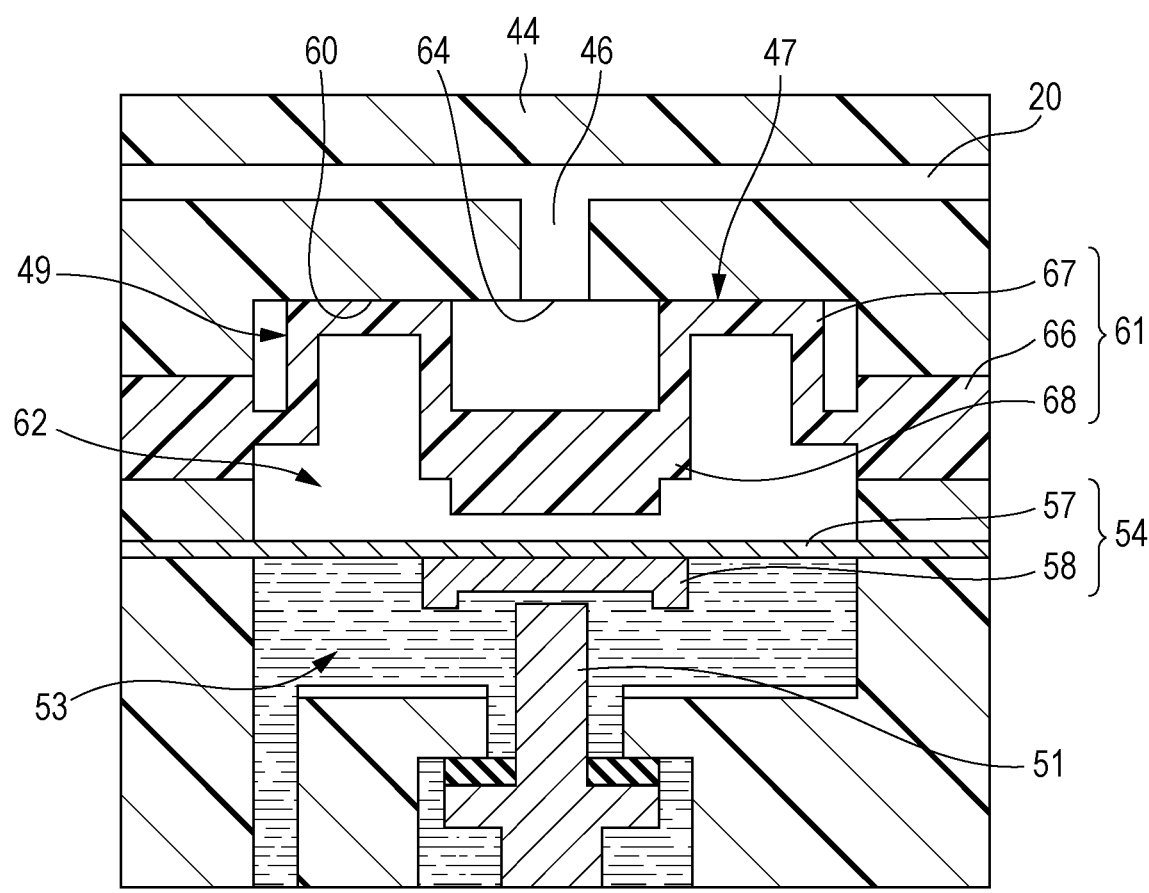
FIG. 13 is a diagram illustrating a configuration of a valve mechanism and a forcible valve opening mechanism according to a sixth embodiment.

FIG. 13 is a diagram illustrating a configuration of the valve mechanism 48 and the forcible valve opening mechanism 49 according to a sixth embodiment. In the present embodiment, during depressurization of the gas chamber 47, the thick wall portion 68 does not abut the opening of the vent hole 64, while the thin wall portion 67 abuts the facing surface 60 of the gas chamber 47 as a contact section to thereby seal the opening of the vent hole 64. In this configuration, since the thin wall portion 67, which allows more gas to permeate therethrough compared with the thick wall portion 68, abuts the facing surface 60, the region of the flexible member 61 which easily allows gas permeation can be reduced. On the other hand, since the thick wall portion 68 allows less gas to permeate therethough compared with the thin wall portion 67, gas permeation through this region can be reduced even if the thick wall portion 68 does not abut the opening of the vent hole 64 and is separated therefrom. In this configuration, preferably, an area of the thin wall portion 67 which is in contact with the facing surface 60 or the side surface 65 is as large as possible. This contributes to reduction in the region that allows gas permeation in the thin wall portion 67, and thus improvement in sealing properties. The other configurations are the same as those of the first embodiment.

The above embodiments have described the configurations in which the control valve 51 is forcibly opened by the flexible member 61 abutting the film member 57, which is a sealing member, to press the film member 57 during pressurization of the gas chamber 47. However, the invention is not limited to the configuration having such a control valve 51, and may be applied to a configuration in which the pressure of liquid in the liquid flow path is increased or the volume of the liquid flow path is changed by the flexible member abutting the sealing member to press the sealing member. For example, a configuration is possible in which the flexible member can press the sealing member to reduce the volume of the liquid flow path so that liquid corresponding to the reduced volume is discharged through the nozzle of the liquid ejecting head, or, in order to prevent an air bubble from being entrained in the nozzle during a wiping operation in which the nozzle surface is wiped by the wiping mechanism, liquid present in the nozzle is expelled onto the nozzle surface as a preliminary operation. Further, the invention can also be applied to a configuration in which the flexible member presses the sealing member to serve as a valve which closes the liquid flow path sealed by the sealing member and regulates a flow of liquid in the liquid flow path.

In the above description, the ink jet recording head 10, which is a type of the liquid ejecting head, has been described as an example. However, the invention can also be applied to other liquid ejecting heads that eject liquid supplied from the valve unit according to the invention, and liquid ejecting apparatuses having the same. For example, the invention can also be applied to liquid ejecting heads having a plurality of color material ejection heads used for manufacturing color filters for liquid crystal displays and the like, electrode material ejection heads used for manufacturing electrodes for organic electroluminescence (EL) displays, field emission displays (FEDs) and the like, and bioorganic ejection heads used for manufacturing biochips (biochemistry element) and the like, and liquid ejecting apparatuses having the same.

What is claimed is:

1. A flow path member comprising:
    a gas chamber which allows inflow and outflow of gas; and
    a flexible member that partitions part of the gas chamber and deforms in response to pressure change in the gas chamber, wherein
    the flexible member has a contact section configured to abut another object, the contact section being disposed inside a regulation section in which deformation is regulated, and the contact section abuts the another object to seal the another object during at least one of depressurization and pressurization of the gas chamber, wherein
    the flexible member includes a first portion that allows more gas to permeate therethrough and a second portion that allows less gas to permeate therethrough than the first portion,
    the another object has a vent hole, which is a gas distribution site, and
    the vent hole is sealed by the contact section included in the second portion.

2. The flow path member according to claim 1, wherein a thickness of the second portion is larger than a thickness of the first portion.

3. A liquid ejecting head configured to eject liquid introduced from the flow path member according to claim 2.

4. The flow path member according to claim 1, wherein at least one of the contact section of the flexible member and an opening of the vent hole protrudes toward the other.

5. A liquid ejecting head configured to eject liquid introduced from the flow path member according to claim 4.

6. The flow path member according to claim 1, wherein the contact section has a shielding member having high gas shielding properties per unit thickness compared with the flexible member.

7. A liquid ejecting head configured to eject liquid introduced from the flow path member according to claim 6.

8. The flow path member according to claim 1, wherein at least one surface of the flexible member is covered with filling liquid.

9. A liquid ejecting head configured to eject liquid introduced from the flow path member according to claim 8.

10. The flow path member according to claim 1, wherein the contact section is in contact with the another object when pressures on both surfaces of the flexible member are equal to each other.

11. A liquid ejecting head configured to eject liquid introduced from the flow path member according to claim 10.

12. The flow path member according to claim 1, wherein at least one of the flexible member and the another object has smoothness higher than the other member in a region to be in contact with the other member.

13. A liquid ejecting head configured to eject liquid introduced from the flow path member according to claim 12.

14. A liquid ejecting head configured to eject liquid introduced from the flow path member according to claim 1.

15. A liquid ejecting apparatus configured to eject liquid by using
    the liquid ejecting head according to claim 14.

16. A flow path member comprising:
a gas chamber which allows inflow and outflow of gas; and
a flexible member that partitions part of the gas chamber and deforms in response to pressure change in the gas chamber, wherein
the flexible member has a contact section configured to abut another object, the contact section being disposed inside a regulation section in which deformation is regulated, and the contact section abuts the another object to seal the another object during at least one of depressurization and pressurization of the gas chamber, and wherein the contact section has a shielding member having high gas shielding properties per unit thickness compared with the flexible member.

17. A flow path member comprising:
a gas chamber which allows inflow and outflow of gas; and
a flexible member that partitions part of the gas chamber and deforms in response to pressure change in the gas chamber, wherein
the flexible member has a contact section configured to abut another object, the contact section being disposed inside a regulation section in which deformation is regulated, and the contact section abuts the another object to seal the another object during at least one of depressurization and pressurization of the gas chamber, and
the contact section is in contact with the another object when pressures on both surfaces of the flexible member are equal to each other.

* * * * *